United States Patent [19]

Benjamin et al.

[11] 4,454,103

[45] Jun. 12, 1984

[54] HIGH ACID MONOCALCIUM PHOSPHATE AND PROCESS FOR PREPARING THE SAME

[75] Inventors: Robert E. Benjamin; Thomas E. Edging, both of Nashville, Tenn.

[73] Assignee: Stauffer Chemical Company, Westport, Conn.

[21] Appl. No.: 515,883

[22] Filed: Jul. 20, 1983

Related U.S. Application Data

[63] Continuation of Ser. No. 370,302, Apr. 21, 1982, abandoned.

[51] Int. Cl.$^3$ ............................................. C01B 25/32
[52] U.S. Cl. ..................................... 423/309; 423/308
[58] Field of Search ................................. 423/309, 308

[56] References Cited

U.S. PATENT DOCUMENTS

| | | | |
|---|---|---|---|
| 2,012,436 | 8/1935 | Sakalatwalla et al. | 23/109 |
| 2,160,232 | 5/1939 | Schlaeger | 23/108 |
| 2,160,700 | 5/1939 | Knox | 423/309 |
| 2,271,361 | 1/1942 | Carpenter et al. | 423/309 |
| 2,514,973 | 7/1950 | Robinson | 423/267 |
| 3,095,269 | 6/1963 | Chiola et al. | 23/109 |
| 3,394,987 | 7/1968 | Lee et al. | 23/109 |
| 3,395,979 | 8/1968 | Schafer | 23/108 |
| 3,954,939 | 5/1976 | Edging et al. | 423/311 |
| 4,044,105 | 8/1977 | Enomoto et al. | 423/308 |
| 4,166,839 | 9/1979 | Skauli et al. | 423/311 |

FOREIGN PATENT DOCUMENTS 518737  3/1940  United Kingdom ................ 423/309

*Primary Examiner*—John Doll
*Assistant Examiner*—Wayne A. Langel
*Attorney, Agent, or Firm*—Paul J. Juettner

[57] ABSTRACT

A high acid monocalcium phosphate can be prepared by partially neutralizing phosphoric acid with lime. A substantially non-caking product can be made by hydrating the high acid product dried to a L.O.I. of between about 16% to less than 18.5% with water to an L.O.I. of from 18.5% to about 23% and drying to a free water content of less than 1%. The product is useful in effervescent dry beverage mixes and pharmaceuticals.

9 Claims, No Drawings

HIGH ACID MONOCALCIUM PHOSPHATE AND PROCESS FOR PREPARING THE SAME

This is a continuation of application Ser. No. 370,302, filed Apr. 21, 1982, now abandoned.

The present invention relates to anhydrous monocalcium phosphate and hydrated monocalcium phosphate having an excess phosphoric acid content as well as processes for the preparation of the same.

High acid monocalcium phosphates are known compositions which find specific uses in areas such as beverages for the complete substitution of fruit acids such as citric, tartaric and malic acids. High acid monocalcium phosphates are also usable in preparing effervescent products such as those commonly containing sodium bicarbonate with or without aspirin or other pain reliever.

Monocalcium phosphate containing an excess of up to 1% by weight free phosphoric acid is very hygroscopic and tends to cake and lose its dry free-flowing characer in a relatively short time. If the acid content is increased to a value corresponding to about 5% free acid, the hygroscopicity is markedly increase with the result that upon storage the product rapidly sets to a solid crystalline mass.

One method of overcoming this problem is disclosed in U.S. Pat. No. 2,514,973 which teaches mixing phosphoric acid with granular monocalcium phosphate in proportions calculated to yield a product containing up to about 18% free acid, passing the product through a vibrating screen to break up any lumps, drying, milling and screening the product to the desired size. While this process allows for the preparation of a non-caking monocalcium phosphate of high acidity, this reaction is complex and costly and it would be desirable to arrive at a process which prepares a high acid monocalcium phosphate by a process which is not as complex and less costly than the process in the referenced patent.

BRIEF DESCRIPTION OF THE INVENTION

In accordance with the present invention, a high acid monocalcium phosphate can be prepared by partially neutralizing phosphoric acid with lime and allowing the reaction to proceed to completion under controlled temperature conditions. The product can be used as such or partially hydrated to form a substantially free flowing non-caking composition.

The resulting product is essentially anhydrous monocalcium phosphate in combination with up to an excess of about 10% by weight phosphoric acid. The hydrated product is a partially hydrated monocalcium phosphate having up to about 5% free acid. This latter completely soluble in water, forming a clear solution up to 1% by weight in contrast to anhydrous monocalcium phosphate which forms turbid solutions.

The product, particularly the hydrated form, finds use in effervescent tablets for pharmaceuticals or dry mix drinks.

DETAILED DESCRIPTION

Methods for preparing anhydrous monocalcium phosphate, the same being characterized as having a loss on ignition ranging from about 14 to less than about 17%, are well known to the skilled artisan. The general reaction is as follows:

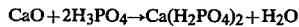

Monocalcium phosphate compositions can be prepared by methods known in the art. U.S. Pat. No. 2,160,700 discloses that anhydrous monocalcium phosphate can be prepared by crystallization from an acid solution. In a preferred method of preparing crystalline anhydrous monocalcium phosphate disclosed in U.S. Pat. No. 2,160,700 a slight excess of lime is added to a relatively concentrated phosphoric acid solution to spontaneously produce a reaction temperature in excess of 140° C. but below a temperature at which substantial amounts of pyrophosphate form. The temperature is usually controlled by the rate of lime addition. The reaction is continued until a substantially dry mass of solid anhydrous monocalcium phosphate is produced.

In accordance with the invention, the phosphoric acid is reacted with an amount of lime sufficient to neutralize from about 90% to about 99% and preferably from about 94% to about 97% of the phosphoric acid. The acid is preferably concentrated having a specific gravity ranging from about 56.0° to about 56.4° Baumé, at 3.5° C.

As is usually done in connection with the preparation of anhydrous monocalcium phosphate, the phosphoric acid can be treated with potassium hydroxide, aluminum hydroxide and sulfuric acid prior to the reaction such that the acid contains 0.7% $K_2O$, 0.25% $Al_2O_3$ and 0.3% $SO_3$. The standard conditions for preparing anhydrous monocalcium phosphate as set forth in U.S. Pat. No. 3,954,939, the disclosure of which is incorporated herein by reference, except as outlined below, can be used in preparing the product of the invention.

It is preferred to maintain the reaction temperature at from about 145° C. to about 170° C. and preferably about 150° C. though temperatures as high as 165°–170° C. have been used. It is preferred that the reaction conditions be such that the non-hydrolyzed product of the invention has a L.O.I. ranging from about 16% to less than 18.5%. At L.O.I.'s below about 16% the non-hydrolyzed product has an increasing tendency to cake and become less soluble. Higher reaction temperatures are to be avoided as this results in a decrease in the L.O.I.

The reaction is continued until a dry product having a L.O.I. ranging from about 16% to less than 18.5% and preferably from about 17.5% to about 18% is obtained. The free acid content of the non-hydrolyzed product can range from about 1% to about 10% by weight based on the total weight of the composition. While this product can be used as is, it is preferred to hydrate the product to improve the handling characteristics of the product.

According to the present invention the high acid monocalcium phosphate compositions can be treated to reduce the caking tendencies thereof by admixing water with high acid monocalcium phosphate composition having a loss on ignition between about 16% and less than 18.5%, permitting the water and monocalcium phosphate to remain in contact for a sufficient length of time to form a hydrated monocalcium phosphate composition with a loss on ignition ranging from between 18.5% and about 23%, and drying the monocalcium phosphate composition to a free moisture content below 1% and preferably below about 0.5% if the admixture has a free moisture content above this level.

Water is admixed with the monocalcium phosphate composition and permitted to remain in contact with the composition for a sufficient length of time to permit the percent loss on ignition to increase to between 18.5% and 23%. At low temperatures, that is, in the range of about ambient temperature to about 40° C., the rate of hydration is relatively slow. It is preferred to contact the water with the anhydrous monocalcium phosphate at a temperature between about 40° and about 95° C., and most preferably between about 50° and about 85° C. At the lower temperatures, reaction between the water and the monocalcium phosphate occurs, but the rate is relatively slow and extended periods of contact may be required. At temperatures above about 95° C., the vapor pressure of water is high and monocalcium phosphate monohydrate tends to revert to the anhydrous form. Therefore, it is preferred to contact the monocalcium phosphate composition with water at a temperature between about 40° and about 95° C. Higher temperatures can be utilized if the hydration is done at an elevated pressure.

The time necessary for the monocalcium phosphate composition having a loss on ignition from 18.5% to 23% to form by the contact of water with the monocalcium phosphate composition with a loss on ignition between 16% and less than 18.5% is not only dependent upon the temperature but also on the initial loss on ignition of the composition.

Generally at the higher temperatures contact times as short as 2 minutes can provide a suitable composition. At room temperature contact time as long as 4 days may be required. In the preferred temperature range contact times from about 3 minutes to about 1 hour are required to provide a suitable composition.

The water is introduced directly into the composition, and distributed relatively evenly throughout the composition. The water can be added directly to the hot material or it can be admixed with a cold composition. It is preferable to admix the water with a composition at a temperature between about 50° C. and 180° C. and most preferably with a composition at a temperature between 75° and 140° C. Hot or cold water can be admixed with the composition. Water at ambient temperature is usually admixed with the composition at the higher temperature in the range.

The water reacts with the substantially anhydrous material to form a monocalcium phosphate composition having a loss on ignition between 18.5% and 23%. The amount of water introduced into the monocalcium phosphate composition with a loss on ignition between 16% and less than 18.5% is calculated to be sufficient to increase the loss on ignition of the composition to between 18.5% and 23%. Allowance is usually made for water lost in reducing the temperature of a hot composition and for water lost as vapor in the air with which the composition may be contacted. A large excess of water above that required to bring the loss on ignition into the required range should not be utilized since the free water content of the final product must be brought to less than 1%.

It is usually not possible to completely react all of the water introduced into the composition. A portion of the water usually remains uncombined in the form of free water. Free water is measured by drying the monocalcium phosphate at 75° C. for 1 hour. The weight loss on drying at 75° C. for 1 hour divided by the initial weight multiplied by 100 is noted as the percent free water.

The percent free water must be below 1% and preferably below 0.5%. The percent free water which can be tolerated in the monocalcium phosphate composition and still provide a material having substantially reduced caking tendencies is dependent upon the percent loss on ignition of the finished product. At a loss on ignition in the range of 19% to 20%, a free moisture content of up to 1% can be tolerated, and still provide a material having reduced caking tendencies. At a loss on ignition of 21 to 23%, the free moisture content must be below about 0.5% to provide a material having substantially reduced caking tendencies. The drying can be conducted at a temperature within the range of from about 55° C. to about 95° C. and preferably from about 70° C. to about 90° C. The process of the invention can be carried out in several treatment zones or by sequential operation carried out in one zone.

The monocalcium phosphate composition while in contact with the water may develop some lightly agglomerated lumps which can be readily broken up by mild agitation, mixing or other means for breaking up lightly agglomerated materials. Once the agglomerates have been eliminated from the composition, the composition shows substantially reduced tendency for caking.

Water can be introduced into the monocalcium phosphate composition having a loss on ignition from 16% to less than 18.5% by means suitable for evenly dispersing a liquid throughout a mass of solid materials. Liquid-solid mixing apparatus, such as pug mills, zig zag blenders, ribbon mixers, rotating drums having spray means and Kneadermaster are suitable for admixing the water with the monocalcium phosphate composition.

The material can also be hydrated by contact with water in a fluid bed. The bed can be agitated by a warm steam-air mixture. The preferred method is to introduce liquid water directly into an agitated bed of material. All percentages and parts used herein are by weight unless otherwise noted.

As used herein, percent loss on ignition refers to the loss in weight if a sample, which has been dried at 75° C. for 1 hour, upon heating at 800° C. for 1 hour, divided by the weight of the original sample after drying at 75° C., multiplied by 100. The percent free water is the loss in weight of a sample on drying at 75° C. for 1 hour divided by the initial weight of the sample, multiplied by 100. The particular ranges of percent loss on ignition and percent free water are critical to the reduced caking tendencies of the product of the invention.

The invention will be illustrated by reference to the following example which clearly points out the critical parameters and the advantages of the process provided by the present invention:

EXAMPLE 1

To 5150 parts of 80% food grade phosphoric acid at a specific gravity of 56.2° Baumé 35° C. treated with KOH, Al(OH)$_3$ and H$_2$SO$_4$ prior to the reaction in amounts sufficient to provide 0.7% K$_2$O, 0.25% Al$_2$O$_3$ and 0.3% SO$_3$ was added 1050 parts calcium oxide in a batch reactor tube with agitation. The lime was added at a rapid rate until the temperature ranged from about 150° C. to about 160° C. The rate of lime addition was then controlled to maintain the temperature of the reaction mixture between about 150° and 160° C. until all the lime had been added. The heat of reaction vaporized the water associated with the reaction mixture. The reaction was continued for about 45 minutes and was controlled to maintain the L.O.I. to as close to 17.5–18.0% as possible. This product at 8% free acid can be used as such.

The product was hydrated with a water spray in the batch tub and dried at a temperature ranging from about 70° C. to about 90° C. to a free water content of about 0.5% to obtain a final product having a L.O.I. of about 22% and about 4% free acid. This product was a substantially free flowing and non-caking granular product.

What is claimed is:

1. A method for preparing a partially hydrated high acid monocalcium phosphate with reduced caking tendencies which comprises mixing ortho phosphoric acid with an amount of lime sufficient to neutralize from 90% to 99% of the phosphoric acid thereby forming a product having excess phosphoric acid, controlling the reaction conditions to maintain a reaction temperature between about 140° C. but below a temperature at which substantial amounts of pyrophosphate will form, continuing the reaction until a substantially dry mass of solid anhydrous monocalcium phosphate having a loss on ignition at 800° C. of between from about 16% but less than about 18.5% is produced, contacting water with said monocalcium phosphate in an amount sufficient to hydrate the monocalcium phosphate to a loss on ignition of from about 18.5% to about 23% by weight, and removing any free water in excess of 1%.

2. The method as recited in claim 1 wherein the free water is reduced to less than 0.5%.

3. The method as recited in claim 1 wherein said lime is used in an amount sufficient to neutralize from about 94% to about 97% of the phosphoric acid.

4. The method as recited in claim 1 wherein the reaction temperature ranges from about 145° C. to about 170° C.

5. The method as recited in claim 1 wherein the mixture formed by contacting the monocalcium phosphate with water is maintained at a temperature ranging from about 40° C. to about 95° C.

6. The method as recited in claim 1 wherein the water is sprayed into an agitated bed of the monocalcium phosphate.

7. A method for preparing a high acid monocalcium phosphate which comprises mixing ortho phosphoric acid with an amount of lime sufficient to neutralize from 90% to 99% of the phosphoric acid thereby forming a product having excess phosphoric acid, controlling the reaction conditions to maintain a reaction temperature between about 140° C. but below a temperature at which substantial amounts of pyrophosphate will form, continuing the reaction until a substantially dry mass of solid anhydrous monocalcium phosphate having a loss on ignition at 800° C. of between from about 16% but less than about 18.5% is produced.

8. The method as recited in claim 7 wherein said lime is used in an amount sufficient to neutralize from about 94% to about 97% of the phosphoric acid.

9. The method as recited in claim 7 wherein the reaction temperature ranges from about 145° C. to about 170° C.

* * * * *

UNITED STATES PATENT AND TRADEMARK OFFICE
CERTIFICATE OF CORRECTION

PATENT NO. : 4,454,103
DATED : June 12, 1984
INVENTOR(S) : Robert E. Benjamin; Thomas E. Edging It is certified that error appears in the above—identified patent and that said Letters Patent is hereby corrected as shown below:

Col. 1, line 22, "characer" should be "character";

Col. 1, line 24, "increase" should be "increased";

Col. 1, line 53, after "latter" insert "product is";

Col. 4, line 56, "tube" should be "tub".

Signed and Sealed this

Second Day of April 1985

[SEAL]

Attest:

DONALD J. QUIGG

Attesting Officer     Acting Commissioner of Patents and Trademarks

UNITED STATES PATENT AND TRADEMARK OFFICE
CERTIFICATE OF CORRECTION

PATENT NO. : 4,454,103

DATED : June 12, 1984

INVENTOR(S) : Robert E. Benjamin; Thomas E. Edging

It is certified that error appears in the above—identified patent and that said Letters Patent is hereby corrected as shown below:

Col. 1, line 22, "characer" should be "character";

Col. 1, line 24, "increase" should be "increased";

Col. 1, line 53, after "latter" insert "product is";

Col. 2, line 22, "3.5°C" should be "35°C";

Col. 4, line 56, "tube" should be "tub".

Signed and Sealed this

Twenty-seventh Day of August 1985

[SEAL]

Attest:

DONALD J. QUIGG

Attesting Officer

Acting Commissioner of Patents and Trademarks